Aug. 21, 1951  W. H. WOODLIEF  2,565,460
PRESSURE TESTING OF PIPE
Filed Dec. 15, 1947  4 Sheets-Sheet 1
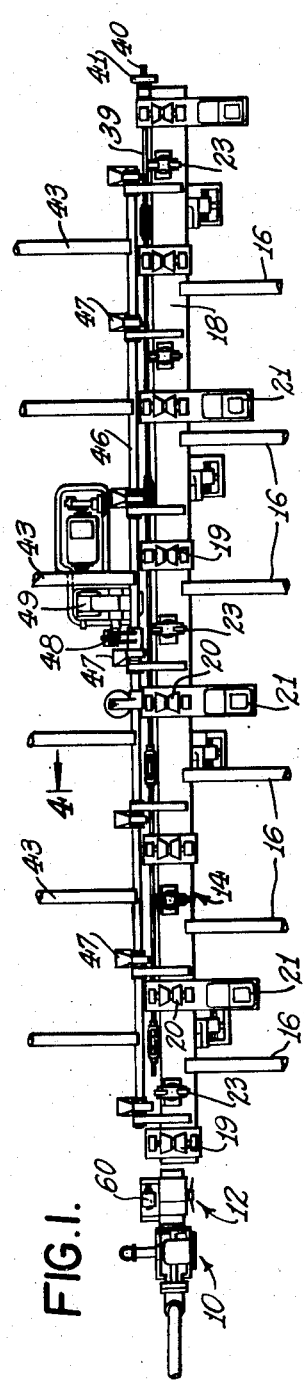
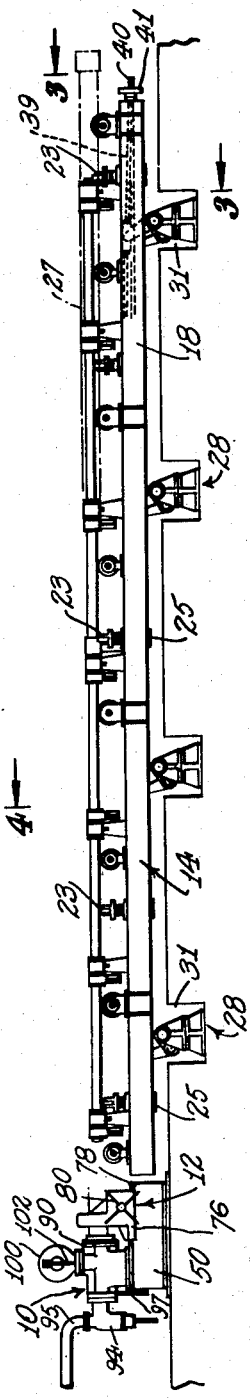
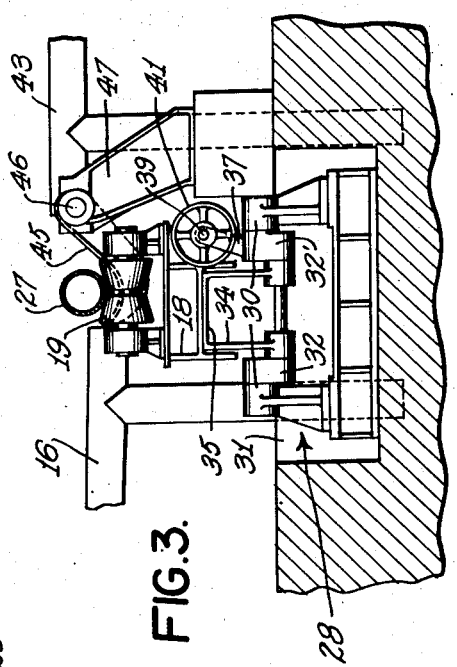
INVENTOR
WILLIAM H. WOODLIEF
BY Robert S. Dunham
ATTORNEY

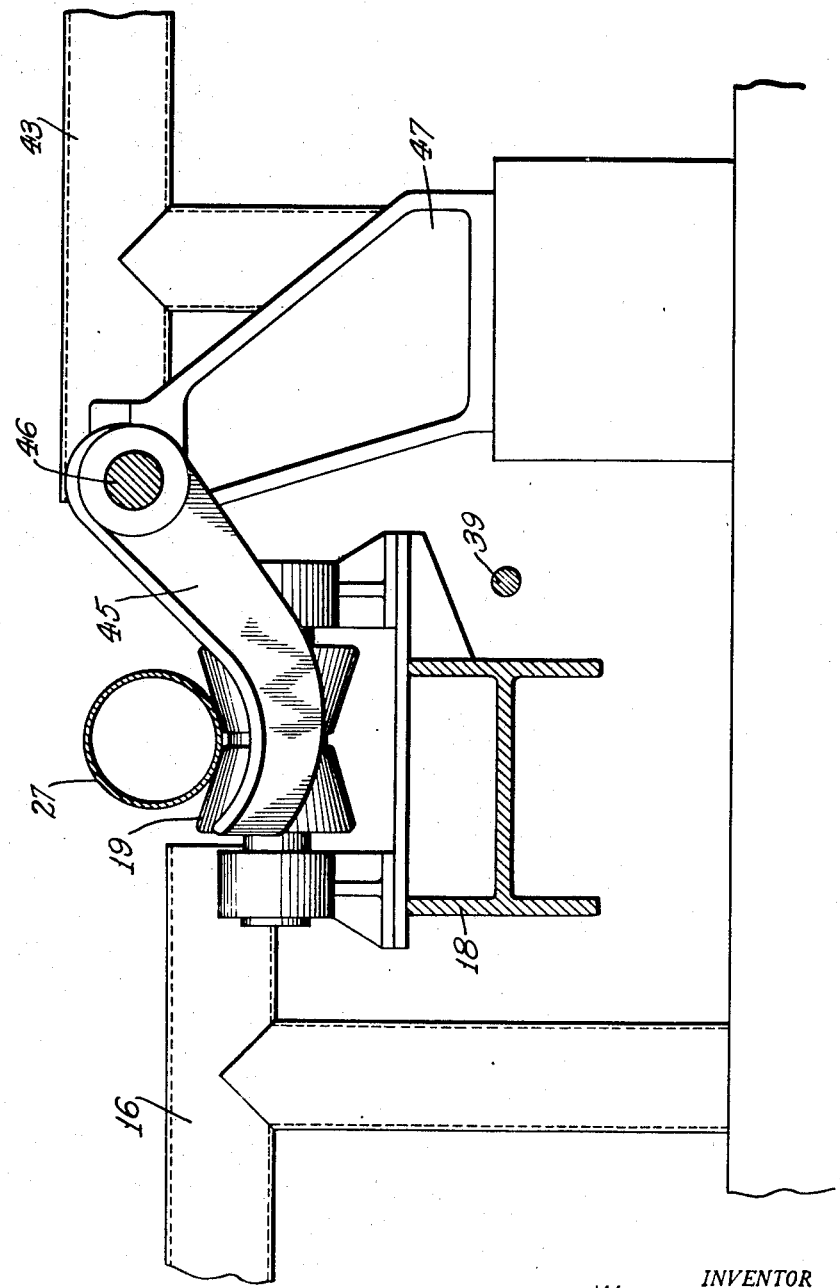

Aug. 21, 1951  W. H. WOODLIEF  2,565,460
PRESSURE TESTING OF PIPE
Filed Dec. 15, 1947  4 Sheets—Sheet 3
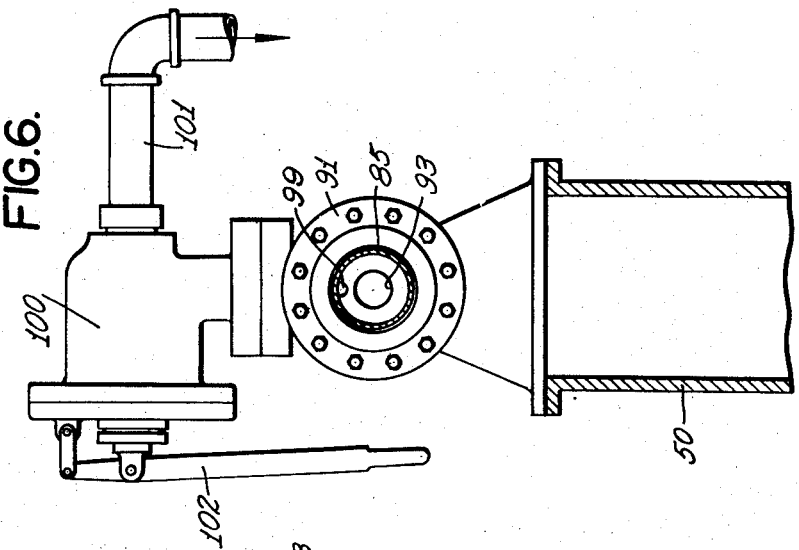
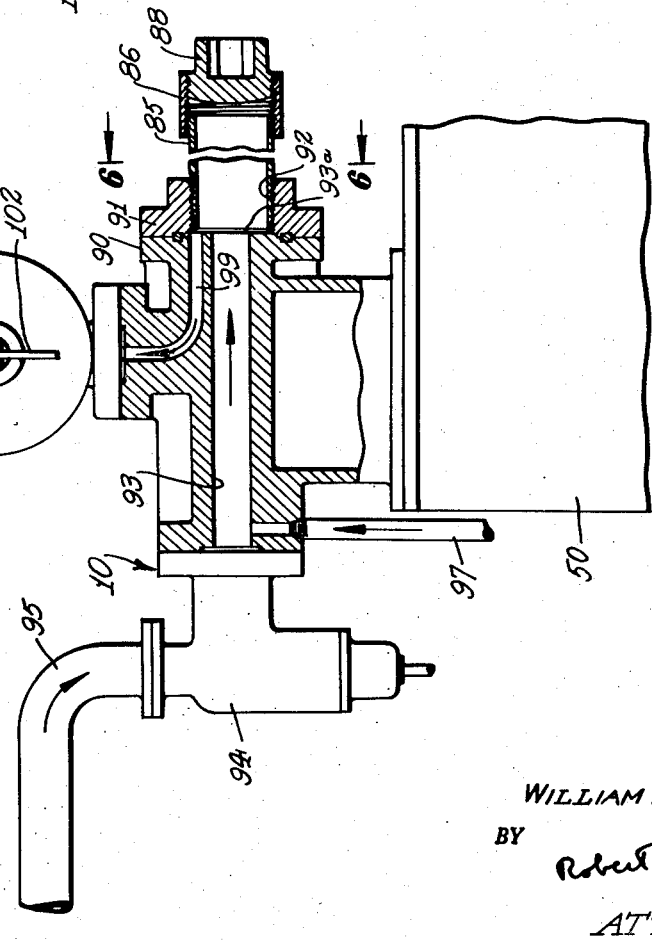
INVENTOR
WILLIAM H. WOODLIEF
BY
Robert S. Dunbar
ATTORNEY

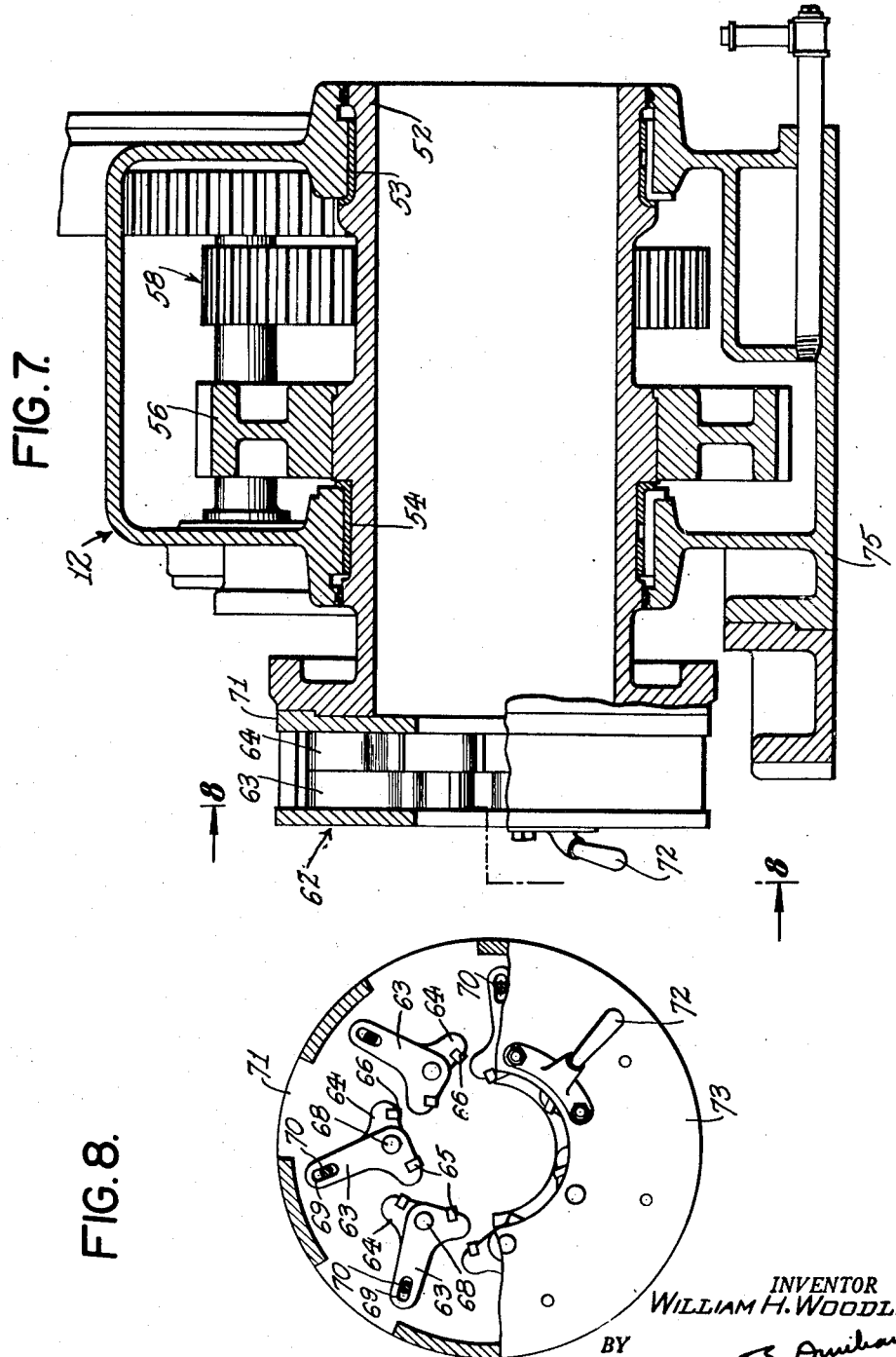

Patented Aug. 21, 1951

2,565,460

UNITED STATES PATENT OFFICE 2,565,460

PRESSURE TESTING OF PIPE

William H. Woodlief, Cleveland Heights, Ohio, assignor to Republic Steel Corporation, Cleveland, Ohio, a corporation of New Jersey Application December 15, 1947, Serial No. 791,749

9 Claims. (Cl. 73—37)

This invention relates to the pressure testing of pipe and more particularly to such testing by static fluid pressure exerted internally and in a manner preferably designed to keep the pipe under tension, due to the pressure, rather than under any appreciable load of compression.

By way of example, it may be explained that pipe used in the oil industry, particularly for well casing, is apt to be employed under extraordinarily severe conditions, particularly of tension on the pipe and on its threaded connections. Oil wells are lined with casings as they are being drilled and as the hole is drilled deeper, section after section of pipe is added to the string that forms the casing, and the weight of the entire string of pipe is at all times supported by the last or top section. In consequence an enormous tensional load may be applied to all of the pipe sections and their couplings, and it is extremely desirable that these parts be tested in advance for their ability to stand such a load.

One prior arrangement for testing oil well casing has involved pressing a water seal against opposite ends of a pipe section, and supplying fluid under high pressure to the interior of the sealed section. In such operation, however, as the testing pressure increases the end thrust or pressure of the seals is also increased to compensate for the greater fluid pressure, and the test is thus accompanied by considerable compressive force or load, contrary to the conditions of actual use. Schemes have also been proposed with the view of avoiding compressional load during the testing operation; one example of such arrangements involves a pressure seal exerted on an auxiliary coupling member of special shape at one end of the pipe and a spring-mounted, rotatable plug intended to be engaged with the other end of the pipe. However, this and other apparatus for such testing have involved a complexity of equipment, or difficulty of adjustment, or other operational shortcomings or expense, and the present invention is accordingly designed to afford simple, effective and entirely feasible procedure for rapidly testing lengths of pipe in the course of manufacture.

Further and important objects of the invention are to provide convenient and rugged apparatus for testing pipe in the manner described, and especially to provide such a machine capable of accommodating relatively heavy long lengths and yet adapted to avoid any compressive load on the pipe during the testing operation. Another object is to afford means which will readily handle successive pipe sections, whether they are of the same or widely differing lengths, with an economy of time and effort, and yet which will permit the interior of each to be subjected to an extraordinarily high static pressure. Further objects are to provide improved means for introducing the fluid under pressure to the pipe while the ends of the latter are sealed, and especially for introducing fluid and then promptly increasing the fluid pressure to a relatively very large value. Additional objects are to provide an improved and more convenient apparatus for handling and moving the pipe in the course of the testing operation, and to provide a simple and easily operated closure arrangement for sealing the pipe.

To these and other ends, including such as are hereinafter apparent or incidental to the use of the present improvements, one example of apparatus embodying them is disclosed in the annexed drawings and the following description, to which reference may be had, by way of illustration, for an understanding of the several features and principles of the invention.

Referring to the drawings:

Fig. 1 is a plan view of pipe testing apparatus constructed in accordance with the invention;

Fig. 2 is a side elevation of the apparatus of Fig. 1;

Fig. 3 is an enlarged end elevation, line 3—3 of Fig. 2;

Fig. 4 is a greatly enlarged vertical section on line 4—4 of Fig. 1;

Fig. 5 is an enlarged view, chiefly in vertical section on the center line of Fig. 1, of the stationary pipe closure or tester head;

Fig. 6 is essentially an end view of the tester head as if seen on line 6—6 of Fig. 5;

Fig. 7 is an enlarged view, chiefly in vertical section on the center line of Fig. 1, of the spinning head near the left-hand end of Fig. 1; and Fig. 8 is a transverse view partly in elevation and partly in vertical section on line 8—8 (Fig. 7) of the chuck device shown at the left-hand side of Fig. 7.

It may be explained that the specific apparatus here shown is designed to accommodate relatively long pieces or sections of pipe, e. g. 30 feet or more in length, such as are preferred for well casing and similar purposes, and although machines embodying the disclosed principles may be built to handle pipe of considerably different length or diameter, an outstanding feature of the invention is its peculiar adaptability for the testing of long, heavy pipe sections as just mentioned.

Referring first to Figs. 1 and 2, the apparatus includes a closure device or testing head generally designated 10, a movable spinning head 12 for gripping and turning the pipe, and a long table or supporting arrangement generally designated 14 on which the pipe is deposited and by which it is advanced lengthwise to the spinning head 12, which in turn cooperates to secure the end of the pipe in the closure 10. For the delivery of pipe sections to the handling table, a plurality of transverse skid bars 16 are disposed in spaced, parallel relation to each other along one side of the table, having a gradual slope as shown in Fig. 3 so that successive pipes may be rolled from the bars to the table.

Journaled in suitable bearings upon and above an elongated frame or bed 18, a series of V rollers alternately designated 19 and 20 constitute a functioning part of the table. Each of the rollers 19, 20 has an annularly grooved or V-shaped surface, as best seen in Fig. 3, so as to center and align a pipe section on the table, the axes of the rollers being parallel to each other, at right angles to the pipe. The rollers 20 are power driven by appropriate reversible motors 21 and the alternate rollers 19 are idlers, it being understood that the total number of such rollers and the relative proportion of idling and driven elements among them may be varied to suit the circumstances of use, except that for handling long pipes a multiplicity of rollers, e. g. as shown, appears preferable.

The frame 18 also carries a plurality of sets of transversely spaced rollers 23, i. e. arranged in pairs at successive distances along the table. Each pair of rollers 23 is suported by a pneumatic or hydraulic cylinder 25 whereby it can be raised or lowered relative to the frame 18 and the rollers 19 and 20, suitable connections (not shown) being provided for simultaneous control of all the cylinders. As shown the rollers 23 have their axes parallel with the pipe and are spaced somewhat laterally of and below the pipe axis, so that when the pipe rests on the pairs of rollers they act, so as to speak, as roller bearing supports for rotation of the pipe. For clarity of illustration a complete length of pipe is not shown in Figs. 1 and 2, but the position of a portion is indicated by dotted lines 27, and a sectional view of it is incorporated in Fig. 3.

Means are provided for adjusting the vertical position of the frame 18, for instance relative to the further instrumentalities described below (i. e. to center the pipe with the stationary closure or for pipe of different diameter) and also if necessary, to facilitate changing the support of the pipe from the rollers 19, 20 to the rollers 23. Such means comprise a plurality of elevating mechanisms spaced along the table, each designated 28 and including a pair of upstanding journal bearings 30 as shown in Fig. 3, seated on the floor or preferably in a suitable recess 31 in the floor. The bearings 30, 30 carry stub shafts of corresponding crank arms 32 and 32' which at their outer ends pivotally support an upright structure 34 having a top web or plate 35 upon which a corresponding part of the frame 18 is seated. The crank arms 32' have an upstanding lever arm 37 which at its upper end is pivotally connected to a long operating rod assembly 39 that extends the entire length of the frame 18 and is carried in bearings in the latter in such manner as to prevent its longitudinal displacement except upon rotation as now to be explained.

The rod 39 has a threaded end 40 engaged by a manually or mechanically operable wheel 41 which is rotatably supported by the frame in the manner of a lead screw, so that as the wheel is turned the rod is gradually displaced in an axial direction. In consequence the upper ends of the several arms 37 are moved lengthwise of the table, rocking the crank arms 32 and 32' and swinging the upright structures 34 about the axes of the bearings 30. Thus the adjustment of the wheel 41 simultaneously operates all of the elevating mechanisms, to shift the frame 18 vertically, up or down in accordance with the direction in which the wheel is turned. To accommodate the necessary vertical displacement of parts when the table 14 is raised or lowered, rod 39 may be provided with suitable universal joints or other sliding joints (not shown), permitting free movement of the table without affecting the rod end 39.

For removal of pipes successively from the handling table a corresponding series of skid bars 43 are disposed on the other side from the bars 16 but in a generally similar manner. To cooperate with the bars 43 a series of lift arms 45 (Figs. 3 and 4) each shaped to hook under the pipe, are spaced along the table, and are carried on a long common shaft 46 that is rotatably mounted in suitable supports 47, so that when the shaft is rotated the arms are moved in unison from the position shown in Figs. 3 and 4 to lift the pipe and roll it back onto the exit bars 43. It will be noted that the lift arms 45 are normally disposed with their pipe lifting surfaces well below the location of the pipe on the rollers 19, 20 or the rollers 23. For actuation when desired, the shaft 46 is connected by linkage 47 (Fig. 1) to suitable reduction gearing generally designated 48 which is in turn operated by a motor 49.

Beyond one end of the table, e. g. at the left as seen in Figs. 1 and 2, a suitable base 50 carries the closure or tester device 10, and also supports the spinning head 12 between the device 10 and the table 14. The spinning head 12 is designed to be traversed by the pipe, as the latter is advanced lengthwise by the V rollers, and then to engage the pipe for delivering it to, and for screwing it in, the tester device 10. As shown more particularly in Figs. 7 and 8 the upper part of the spinning device comprises a tubular head element 52, axially aligned with the pipe on the table and mounted for rotation about such axis, in suitable bearings 53, 54. Keyed to the tubular element 52, a gear 56 is provided, which through further gearing generally designated 58, constitutes a driving connection to the element 52 from a source of power such as a reversible motor 60 (Fig. 1).

At one end the tube 52 carries means for gripping the pipe, i. e. by frictional or like engagement with its exterior surface. In the apparatus shown, the gripping means comprises an annular series of chucks generally designated 62, including pairs of overlapping chuck members 63, 64 alternatively engageable with the pipe for forward or reverse drive respectively, and having gripping projections 65, 66. Each pair of chuck members is pivoted on a stud 68 and each member at its outer end has a slot 69 receiving a rod or stud 70. Each stud 70 thus actuates both members of a pair so that the latter may rock together relative to a radius of the stud 68, upon angular displacement between the studs 68 and the studs 70 about the axis of the member 52. Thus when the members are swung in one direction, e. g. into the position shown, the projections 65 are moved inward to grip the pipe for forward rotation, and when the members are swung to an opposite position, the projections 66 are disposed to engage the pipe, i. e. for rotation in reverse direction. The studs 70 are seated in a face plate 71 on the end of the tube 52, and the chucks are manually or pneumatically operable by a handle or lever 72 on a cover plate 73 which carries the studs 68 and which is mounted for limited angular movement relative to the plate 71, each of the plates 71, 72 being centrally apertured to clear the pipe.

The base 75 of the spinning head bearing structure has a traveling support 76 arranged for motion along a track 78 in a direction lengthwise of the pipe. Through rack and pinion or other appropriate mechanism (not shown) in the housing of the support 76, the spinning head may thus be advanced toward or retracted from the closure device 10, e. g. by turning a hand or otherwise operated wheel 80.

It may be explained here that each pipe 27 fed to the receiving V rollers 19, 20 is externally threaded at each end and carries, tightly screwed on its end 85 (Fig. 5) remote from the spinning head, a coupling sleeve 86. For the testing operation and preferably before the deposit of the pipe on the V rollers, a plug 88 is firmly screwed into the open end of the coupling 86, thus providing a simple but effectively sealed closure for the end 85, wholly movable with the pipe.

Referring now to Figs. 5 and 6 as well as Figs. 1 and 2, the closure device 10 for the other end comprises a body portion 90 fixed on the base 50 and carrying a female coupling element 91 in alignment with the pipe as the latter is supported and advanced by the means hereinabove described. The coupling 91, thus stationarily secured, is internally threaded to engage the external threads around the open end 92 of the pipe. The body portion 90 has a longitudinal passage 93 opening through the vertical face 93a communicating with the pipe to be tested. Through a check valve 94, the passage 93 communicates with a conduit 95 for supply of water under low pressure as hereinbelow explained. Another conduit 97, of smaller diameter, opens into the passage 93 for communication with a source of water under high pressure, e. g. as furnished by a suitable pump (not shown).

When the pipe is being filled with water the displaced air should be removed, and for that purpose a supplemental passage 99 opens into the face 93a at its upper edge and extends to a manually or pneumatically actuated purge valve 100 from which the air can be discharged through an outlet 101. The purge valve 100 may be of a type normally biased to a closed, pressure-tight position.

With the described instrumentalities, the operation for testing successive pipe lengths is easily performed and requires little or no skill on the part of the attendants. Pipes to be tested are placed on the skid bars 16, and while there may be fitted with the couplings 86 and the plugs 88 at their outer ends 85. With the rollers 19 and 20 in receiving position, one pipe is moved onto the rolls, where it comes to rest as shown in Fig. 3. The motors for the rollers 20 are then energized, turning the latter and advancing the pipe lengthwise to and through the tubular portion 52 of the spinning head 12. The drive of the rollers 20 is interrupted when the pipe end 92 extends a short distance beyond the cover plate 73, and the chucks 62 are then manually operated by the handle 72, to grip the pipe. At this time the transverse bearing rollers 23 may be elevated by actuation of their hydraulic or pneumatic cylinders 25, to lift the pipe from the V rollers 19 and 20.

The hand or otherwise operated wheel 80 is now turned, moving the spinning head and the pipe toward the closure device 10 until the end of the pipe abuts the coupling element 91. Thereupon the motor 60 is energized to rotate the head 52 and consequently the pipe—for example in a clockwise direction in Fig. 3—so as to screw the end of the pipe into the coupling element 91. Preferably, rotation of the pipe may commence before it actually abuts the coupling, but in any event proper coordination of control of the hand wheel and the motor 60 is easily achieved to initiate the desired threaded engagement between the pipe and the coupling. Continued rotation of the spinning head then automatically screws the pipe into the coupling (without further use of wheel 80), and finally, the rotation is interrupted when the pipe is tightly secured. For best operative convenience in most cases, the motor 60 can be of such type, or have such clutch connection, as may simply permit the spinning head to be automatically stopped by the tightening of the threaded engagement—all without damage to the motor or other driving parts.

Both ends of the pipe are now sealed and its end 92 is securely held by the coupling element 91 of the closure device, the remainder of the pipe simply resting on the transverse rollers 23 which constituted a roller support during the screwing-in operation. The plugged, remote end 85 is longitudinally free and there is no compressive force on the pipe throughout its entire length. If desired, the chucks 62 can also be released at this time.

The check valve 94 is then opened to allow water to flow into and fill the pipe through the passage 93, and as the interior fills, the purge valve 100 is operated (for example, being air- or oil-actuated) to release the entrapped air. The water thus supplied through the conduit 95 is under an approximately low pressure, for example about 40 pounds per square inch, so that the pipe can be filled without entrapment of air bubbles or other adverse effect due to turbulence. When the pipe is completely filled the check valve 94, which may be an air operated device of known construction, automatically shuts off the low pressure inlet, thus sealing the left-hand end of the passage 93 so that the subsequent application of high pressure will not be impaired by causing the water to back up in the conduit 95. The purge valve 100 being also closed, pumping or other operation is then initiated to supply water under high pressure, or to raise the pressure in the system, through the line 97; if desired, energization of suitable pumping instrumentalities can be automatically effected by the aforesaid actuation of the check valve 94, through appropriate control devices, not shown. The high pressure pump continues in operation, to build up to the required testing pressure in the sealed system including the pipe 27. For example, to test well casing that has a 7 inch outside diameter, a pressure of about 2800 pounds per square inch should ordinarily be reached. Finally, to complete the test, the pipe can be held at the stated or other selected maximum pressure for a desired period of time.

After the actual testing cycle is thus finished, the high pressure pump is stopped and purge valve 100 is opened to relieve pressure in the pipe.

The chucks 62 are actuated to engage the pipe for reverse rotation and to effectuate such rotation the motor 60 is energized in reverse or through suitably reversed driving mechanism. Accordingly the spinning head 12 unscrews the pipe from the stationary coupling element 91, and wheel 80 can then be turned, to back the pipe away from the closure device. When the pipe is free of the latter the spinning head is stopped, the chucks 62 are released and the relative positions of the transverse rollers 23 and the V rollers 19, 20 are restored to their original position so that the pipe again rests on the V rollers. The driven V rollers 20 are energized in reverse, to move the pipe away from the spinning head and back along the table, it being understood that during this time, the water may run out of the open end 92 of the pipe, to be caught by a suitable sump, not shown.

Finally when the pipe has reached an appropriate location on the table 14, the V roller drives are interrupted and the mechanism including the motor 49 is started, to rock the lift arms 45, clockwise as seen in Fig. 3, so that they raise the pipe and roll it off onto the exit skid bars 43. There the plug 88 can be removed, leaving the coupling 86 in place; and if the pipe has withstood the test, it may be advanced to other localities, e. g. for painting and shipping.

It will now be appreciated that the described instrumentalities afforded a thoroughly effective performance of the testing operation with fluid at a desired high pressure. At the same time, there are no compressive loads whatever on the pipe and full tension may be developed throughout its length, e. g. between the oppositely directed forces of pressure on the plug 88 and the closure body portion 90, respectively. Thus the threads at each end of the pipe are under tension, as well as the pipe itself. This tension may be very considerable; for example, a 7 inch outside diameter pipe having a $\frac{3}{8}$ inch wall resulting in an inside diameter of 6¼ inches has an internal cross-sectional area of about 35 square inches, so that a total force of about 98,000 pounds is exerted at each end of the pipe, i. e. against the inner side of the plug 88 and against the closure body portion 90, when the water pressure has reached a value of 2800 pounds per square inch.

The arrangement is extremely simple to use, requiring no particular skill at any stage, and provision is made for properly supporting and guiding the pipe at all times, so as to avoid damaging or deranging it in any way. Although the apparatus is particularly effective for a hydrostatic test, e. g. with water, it will now be seen that equipment embodying the described principles may be adapted for use with other fluids, either gaseous or liquid.

It is to be understood that the invention is not limited to the specific apparatus herein shown and described, but may be carried out in other ways without departure from its spirit as defined by the following claims.

I claim:

1. Pipe testing apparatus comprising, in combination, a stationary closure for one end of a pipe to be tested, said closure having threads to engage threads at said end of the pipe and being thereby arranged to hold the pipe against longitudinal displacement, solely by said threaded engagement, and said closure including means for introducing fluid under pressure to the interior of the pipe, means releasably engageable with the pipe for rotating the latter to screw its aforesaid threads into engagement with the threads of the closure, said pipe-rotating means being movable to carry the pipe longitudinally to and into threaded engagement with the closure, supporting means for the pipe arranged cooperatively with the closure to support the pipe wholly free of longitudinal compression relative to said threaded engagement with the closure, and a removable closure for the other end of the pipe, movable with the pipe to avoid longitudinal compression of the latter.

2. Pipe testing apparatus comprising, in combination, a non-rotatable closure to which one end of a pipe is to be screwed, pipe supporting means to hold the pipe in alignment with said closure, means intermediate said supporting means and said closure and engageable with the pipe for rotating the latter to screw its end to the closure, said closure including means for introducing fluid under pressure to the interior of the pipe and said supporting means including means rotatable about an axis transverse of the pipe for rolling the latter to the pipe rotating means, and a removable closure for the other end of the pipe, movable with the pipe to avoid longitudinal compression of the latter.

3. Pipe testing apparatus comprising, in combination, a stationary closure adapted to be releasably secured to an end of the pipe upon rotation of said pipe relative to the closure, means for supporting the pipe in alignment with the closure, and means disposed adjacent the closure device in alignment with the supporting means and releasably engageable with the pipe, for rotating the latter in a manner to secure it to the closure, said pipe-rotating means being movable toward and away from the closure to bring the end of the pipe into engagement therewith for said securing operation by the pipe-rotating means, and said closure including a passage therethrough and having means connected therewith for supplying fluid under pressure to the interior of the pipe, and a removable closure for the other end of the pipe, movable with the pipe to avoid longitudinal compression of the latter.

4. Pipe testing apparatus comprising, in combination, a non-rotatable closure to which one end of a pipe is to be screwed, pipe supporting means to hold the pipe in alignment with said closure, means intermediate said supporting means and said closure and engageable with the pipe for rotating the latter to screw its end to the closure, said closure including means for introducing fluid pressure to the interior of the pipe and said pipe supporting means including a set of V-rollers on axes transverse of the pipe, adapted to support the latter and advance it to the rotating means, a set of transversely spaced rollers on axes parallel to the pipe adapted to constitute roller bearing support for the pipe to facilitate rotation thereof, said first and second-mentioned rollers being selectively disposable in pipe-supporting position, and means for moving one set of rollers relative to the other, to shift the support of the pipe from one to the other, and a removable closure for the other end of the pipe, movable with the pipe to avoid longitudinal compression of the latter.

5. Pipe testing apparatus comprising, in combination, a closure device for the end of a pipe, including a female member internally threaded to receive external threads on said pipe end, and means for introducing fluid under pressure into the pipe thereby attached, a spinning device through which the pipe can be longitudinally inserted and which includes rapidly releasable means to grip the pipe, for rotating the same, said spinning device being movable to carry the pipe longitudinally into abutment with said female member for rotative operation of the spinning device to screw the pipe into said member, and supporting means for the pipe aligned with the closure and spinning devices, including means rotatable about an axis transverse of the pipe for rolling the latter to the spinning device.

6. Pipe testing apparatus as described in claim 5, wherein the fluid introducing means comprises passage means to communicate with the pipe for supplying liquid at a low pressure to fill the pipe and thereafter at a higher pressure to produce longitudinal tension in the pipe, and cooperating passage means for removal of air from the pipe as it is filled, and wherein the last mentioned rotatable means comprises a plurality of spaced V-rollers with their V grooves aligned to receive the pipe, and said supporting means also including, on each side of the pipe and beneath the same, a plurality of rollers having axes parallel to the pipe and adapted to provide a roller bearing for the rotation of the pipe by the spinning device, said last mentioned pluralities of rollers being movable relative to the plurality of V-rollers so that the pipe may be engaged and supported selectively by either the V-rollers or the last mentioned rollers.

7. Pipe testing apparatus comprising, in combination, a stationary closure for one end of a pipe to be tested, said closure having threads to engage threads at said end of the pipe and being thereby arranged to hold the pipe against longitudinal displacement, solely by said threaded engagement, and said closure including means for introducing fluid under pressure to the interior of the pipe, means releasably engageable with the pipe and adapted to be turned for rotating the pipe to screw its aforesaid threads into engagement with the threads of the closure, said pipe-rotating means being movable axially with the pipe as the threads of the pipe are screwed into engagement with the closure, whereby said pipe may be held against longitudinal displacement only by said first mentioned closure, and a removable closure for the other end of the pipe, movable with the pipe to avoid longitudinal compression of the latter.

8. Pipe testing apparatus comprising, in combination, supporting structure for the pipe to be tested, including means selectively engageable with the pipe to advance the latter longitudinally or to support it for free rotation about its axis, a stationary closure device disposed in alignment with a pipe supported on said structure and adapted for releasably sealing an end of the pipe, said device including a stationary threaded portion to be engaged by threads at the end of the pipe upon rotation of the pipe, means connected with said closure device for introducing fluid under pressure to the interior of the pipe through the closure device, means releasably adapted to grip the pipe upon advancement of the latter thereto for rotating the pipe into engagement of its threads with said threaded portion, and a removable closure for the other end of the pipe, freely movable with the pipe and supported solely thereby.

9. Pipe-testing apparatus as described in claim 8, wherein the pipe-rotating means is disposed intermediate the pipe-supporting means and the closure device, and wherein the pipe-rotating means comprises a rotatable head having an opening to be traversed by the pipe, chuck means on the head around the opening for gripping the pipe, and driving means for rotating the head.

WILLIAM H. WOODLIEF.

REFERENCES CITED

The following references are of record in the file of this patent:

UNITED STATES PATENTS

| Number | Name | Date |
|---|---|---|
| 640,881 | Deming | Jan. 9, 1900 |
| 1,187,665 | Simms | June 20, 1916 |
| 2,122,760 | Scott et al. | July 5, 1938 |
| 2,183,974 | Richardson | Dec. 19, 1939 |
| 2,231,807 | Hybarger | Feb. 11, 1941 |
| 2,242,658 | Protin | May 20, 1941 |
| 2,293,107 | Branham | Aug. 18, 1942 |

Certificate of Correction

Patent No. 2,565,460 August 21, 1951

WILLIAM H. WOODLIEF

It is hereby certified that error appears in the printed specification of the above numbered patent requiring correction as follows:

Column 6, line 45, for "approximately" read *appropriately*;

and that the said Letters Patent should be read as corrected above, so that the same may conform to the record of the case in the Patent Office.

Signed and sealed this 8th day of January, A. D. 1952.

[SEAL]

THOMAS F. MURPHY,
*Assistant Commissioner of Patents.*